United States Patent [19]
Snyder et al.

[11] Patent Number: 5,121,599
[45] Date of Patent: Jun. 16, 1992

[54] OIL FILTRATION SYSTEM AND METHOD

[75] Inventors: James G. Snyder, North Windham; Richard M. Slayton, South Windsor; William E. Fuller, West Hartford, all of Conn.; Robert J. Makowski, deceased, late of Higganum, Conn., by Patricia N. Makowski, executrix

[73] Assignee: United Technologies Corporation, Hartford, Conn.

[21] Appl. No.: 658,947

[22] Filed: Feb. 21, 1991

[51] Int. Cl.$^5$ .......................... F02G 3/00; F01M 1/18
[52] U.S. Cl. .................................. 60/39.02; 60/39.08; 184/6.4; 184/6.11
[58] Field of Search ............................ 60/39.02, 39.08; 184/6.4, 6.11

[56] References Cited

U.S. PATENT DOCUMENTS

| | | | |
|---|---|---|---|
| 2,672,010 | 3/1954 | Newcomb | 60/39.08 |
| 2,729,339 | 1/1956 | McCoy | 184/6.4 |
| 4,424,665 | 1/1984 | Guest et al. | 60/39.02 |
| 4,511,016 | 3/1985 | Döell | 184/6.11 |
| 4,531,358 | 6/1985 | Smith | 184/6.11 |

FOREIGN PATENT DOCUMENTS

| | | |
|---|---|---|
| 0702551 | 1/1965 | Canada . |
| 2811679 | 1/1979 | Fed. Rep. of Germany . |
| 0279717 | 12/1986 | Japan . |

Primary Examiner—Richard A. Bertsch
Assistant Examiner—Howard R. Richman

[57] ABSTRACT

A method and system (10) for rerouting the pressurized oil flow of an engine (not shown) from a primary filter (14) to a secondary filter (18) in the event of a first sensed pressure differential across the primary filter (14) which exceeds an allowable pressure differential, the excessive differential indicative of a primary filter (14) obstruction. In the event of a subsequent second sensed pressure differential which exceeds a second and higher pressure differential across the secondary filter (18), the oil flow is then diverted through a pump relief valve (19) toward the oil reservoir (26), away from an engine bearing compartment (50). The system (10) also provides sequenced first and second level warnings (40, 42) to the controller/flight crew, said warnings responsive to the operating status of the system (10).

11 Claims, 1 Drawing Sheet

OIL FILTRATION SYSTEM AND METHOD

DESCRIPTION

1. Technical Field

This invention relates to lubrication filtration systems, and more particularly to a lubricant filtration system for turbines.

2. Background Art

In pressurized lubrication systems, a lubricant flow is directed through a network of conduits to specified regions of a machine to serve numerous functions, such as lubrication and cooling. This lubricant flow may carry a residual quantity of particulate matter, such as metallic filings, sediments, or other undesirable solids generated by, for example, the material wear occurring at sliding or impacting surfaces of numerous internal components. The lubrication system of a turbine engine directs a substantial volume of a lubricant to its engine bearing compartments to provide the ongoing necessary lubrication and cooling of the bearings contained therein.

It is well known that by effectively filtering abrasive and undesirable particulate matter from the lubrication flow, additional wear to the machine's components may be minimized, and especially at the shaft bearings in a gas turbine engine.

According to the prior art, a lubricant filter element is disposed in a lubrication system conduit upstream of the bearing compartments of a turbine engine and prevents the introduction of undesirable particulate matter to the engine bearings, adversely affecting bearing wear and engine performance. An indicated pressure differential between an upstream inlet and a downstream outlet of the filter element is indicative of several important operating parameters.

One such parameter is the degree of flow obstruction by captured particulate matter within the filter element. In general, a substantial capture of particulate matter will result in an increased pressure differential across the filter element. Pressure differential sensors, which are well known in the art, inform the engine controller or flight crew of a substantial or complete obstruction of the filter element. In response to a pressure differential indication (whether actual or erroneous) which exceeds a predetermined maximum differential, the controller is then required to initiate a throttleback or engine shutdown procedure to avoid damage to the engine due to decreased lubricant flow.

Thus, an important problem facing engine controllers/flight crews is the necessity of throttling back or shutting down an engine due to an apparent but unverified excessive pressure differential indication, especially in the instance of an erroneous pressure indication.

One solution used in the current art is the diversion of the unfiltered lubricant flow to the bearing compartments through a bypass valve in response to an actual or indicated (but erroneous) obstructing event, resulting in an unfiltered, but continuing, lubricant flow throughout the engine. While permitting the engine to continuous operation, the unfiltered diverted flow may deliver contaminants to the bearing compartment.

SUMMARY OF THE INVENTION

Accordingly, it is an object of the present invention to provide a continuing filtered lubricant flow to the engine in the event of either an actual lubricant flow blockage occurring in the vicinity of a primary lubricant filter, or in the event of an apparent but erroneous indication of a primary filter blockage.

It is another object to provide a continuing filtered lubricant flow to the engine in the event of an indicated filter pressure differential indication which falls beyond an acceptable primary filter pressure differential range.

It is yet another object to prevent an unfiltered lubricant flow from reaching the engine in the instance of complete filter blockage of primary and secondary filters.

The present invention provides an improved lubricant filtering system for engines, and especially for the turbine engines used in many aircraft applications. This system improves on current filtering schemes by providing a filtered secondary lubricant flowpath to the engine and its bearing compartments in the event of an obstructed or otherwise disrupted primary flowpath. This redundancy thereby allows for the continuing operation of the engine at normal power settings in the event of either a substantial obstruction of the primary filter or in the event of an erroneous indication of an obstructed primary filter. This condition is indicated to the engine controller by a first level warning indicator.

A pump relief valve is activated in a event of a complete obstruction of both filters. The pressurized flow of lubricant is directed away from the obstructed filters and returned to the main oil tank, thereby preventing the introduction of undesirable particulate matter, carried by the unfiltered oil flow, to the engine. This condition is indicated to the controller by a second level warning indicator.

More specifically, the system of the present invention reroutes the oil flow, through a first valve, from a primary conduit having a primary filter to a secondary filter, which may be housed together with or separately from the primary filter, in response to a detected pressure differential across the primary filter which exceeds a predetermined maximum allowable pressure differential, the excessive reading indicative of a partial or complete obstruction of the primary filter. A second, pressure return, valve disposed upstream of both filters allows for the return of an unfiltered oil flow to the main oil reservoir in the event of a subsequent partial or complete obstruction of the secondary filter, which is indicated by either an associated excessive pressure differential across that filter or by a pressure sensor disposed upstream of the bearing compartment. Operation of the valves is monitored and controlled by the engine controller and/or flight crew through either manual or automatic indicating and switching means.

The invention thus allows the engine operator/flight crew to continue operation of the engine at normal power in the event of a first level indication, whether actual or erroneous, of an obstructed primary filter. This new filtration system also eliminates contamination of selected regions of an engine such as its bearing compartments by preventing an unfiltered lubricant flow to these regions in the event of a total filtration system obstruction.

DETAILED DISCLOSURE

Figures 1, 1A:
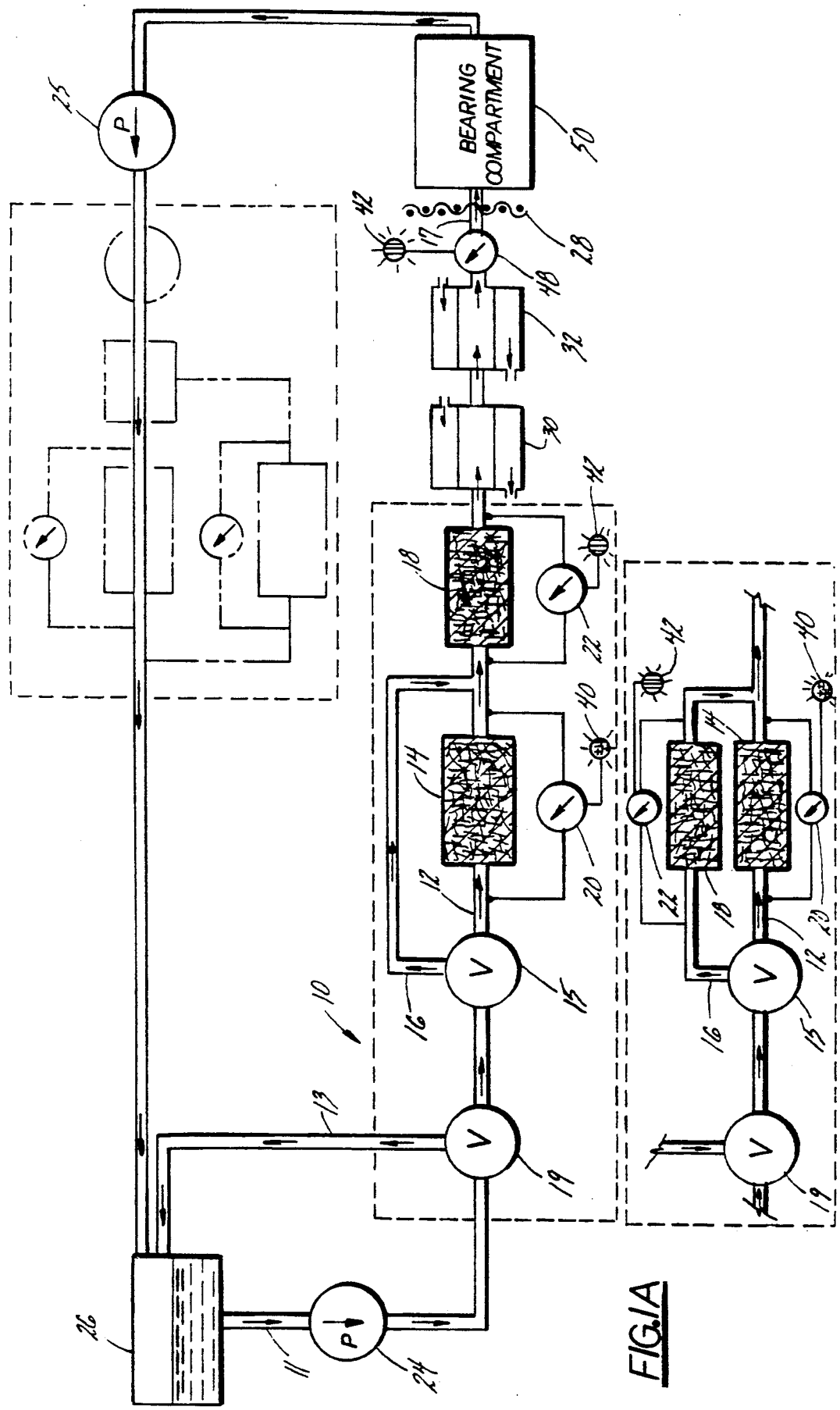
FIG. 1 is a flow diagram of the oil filtration system of the present invention.
FIG. 1a is an alternative embodiment of the present invention.

FIG. 1 schematically represents, within the dashed box, a redundant oil filtration system 10 according to the present invention for a gas turbine engine (not shown). The filtration system 10 is disposed downstream of a main oil pump 24 which provides pressurization to a lubricant flow originating from an oil reservoir 26. The lubricant needed for engine requirements is flowed from the oil reservoir 26 through a conduit 11 to the oil pump 24 using either gravity or pressurized means. The pressurized oil from the pump 24 is then flowed to an engine bearing compartment 50 through the filtration system 10, and, depending on the particular engine installation, through an air/oil exchanger 30, a fuel/oil heat exchanger 32, and/or a last chance screen 28. The pressurized circuit initiated at the oil pump 24 and terminating at the bearing compartment 50 will henceforth be termed the pressure side of the lubrication system. The oil flow exiting from the bearing compartment 50 through a scavenge pump 25 and returning to the oil reservoir 26 will henceforth be termed the scavenge side of the lubrication system.

More specifically, this system 10, according to the present invention, reroutes the pressurized oil, which normally flows through a primary conduit 12 housing a primary filter 14 to a secondary filter 18 in response to a detection of an excessive pressure differential across the primary filter 14. The secondary filter 18 may be disposed either downstream of, or in parallel with, the primary filter 14. The differential pressure is detected by a first pressure sensor 20.

A bypass valve 15 disposed upstream of the primary filter 14 reroutes the oil flow to the secondary filter 18 in response to a sensed excessive pressure differential indication. This excessive pressure differential is indicative of a partially or completely clogged primary filter 14 or primary conduit 12. According to the present invention, sensory detection by the first pressure differential sensor 20 of an excessive pressure across the primary filter element 14 provides a first level warning 40 to the cockpit crew or engine controller. In an aircraft context, an amber warning light or other suitable indication provides the first level warning indication of the clogged primary filter 14 to the crew, which can then activate the bypass valve 15, which allows the oilflow to reenter the conduit upstream of the secondary filter 18, thus allowing continued operation of the engine through the use of the secondary filter 18.

In the event of a subsequent substantial or complete blockage of both filters 14, 18, the oil flow is rerouted back to the oil reservoir 26 through a pump relief valve 19. This condition is indicated by an insufficient pressure in the main oil pressure line 17 disposed immediately upstream of the bearing compartment 50, as detected by a pressure sensor 48 therein disposed. In the event of a subsequent blockage to the secondary filter 18, a second level warning indication 42, which is detected by either second sensor 48, 49, is made to the flight crew or controller via a red warning light or other like indicating means. The pump relief valve 19 is then operated to return the unfiltered oil flow to the oil reservoir 26 via a conduit 13 disposed upstream of the filtering system 10, thereby preventing unfiltered oil from flowing to the bearing compartment 50.

Alternatively, detection of a subsequent blockage of both filters 14, 18, may be indicated by an excessive pressure differential across the secondary filter 18, as sensed by yet another pressure differential sensor 22. In either of these configurations, diversion of the unfiltered oil through the pump relief valve 19 in response to a secondary pressure indication 48, 22 prevents its introduction to the bearing compartment 50.

FIG. 1a shows an alternative configuration of the system 10 wherein a secondary conduit 16, housing the secondary filter 18, is physically separate from the primary conduit 12. Unlike the configuration of FIG. 1, the lubricant is not sequentially flowed through the secondary filter 18 after passing through the primary filter 14 in the normal operation of the lubrication system and the filtration system 10 incorporated therein. However, this alternative configuration still provides the continuing filtered lubricant flow to the engine (not shown) in the event of an actual or erroneous indication of a primary filter 14 blockage.

The primary and secondary filters 14, 18 may be installed together or in separate housings as required by a particular engine configuration and/or access requirements. The filtering media, provided by Aircraft Porous Media, Inc. (Pinellas Park, Fla.), has a primary filter porosity of nominally 30 microns, or generally within a range of 10 to 60 microns. The porosity of the secondary filtering media is nominally 150 microns.

The pressure sensors 20, 22, 48, of the present invention may be of any design having the ability to accurately and precisely detect an anticipated pressure differential exceeding a maximum allowable level or range. In general, the primary filter 14 causes a 5 psi differential between its inlet and outlet during normal, relatively unobstructed, operation of the filtration system.

According to the present invention, a first level warning indication 40 is made to the controller, as previously discussed, when the first sensor 20 detects a pressure differential of about 35 psi, the warning provided to the operator via an amber light or another effective indicator. The engine controller is prompted by this indication 40 to further monitor the system 10 for a continuing and undesirable increase in oil pressure above 35 psi. The bypass valve 15 is opened when the oil pressure reaches about 50 psi, diverting the oil flow to the secondary filter 18. Operation of the bypass valve 15 is activated manually, by the engine controller/flight crew, or by an automated system, as is more fully described below. A second level warning 42, provided to the operator by a red light or another effective indicator, is indicated when the second sensor 22 either detects an excessive pressure differential (nominally 410 psi) across the secondary filter 18, or when a third pressure sensor 48 detects an insufficient supply pressure (indicating insufficient lubricant flow) immediately upstream of the bearing compartment 50. Should either condition be met, the pump relief valve 19 then opens to cause the unfiltered oil to recirculate back to the oil reservoir 26, and away from the bearing compartment 50.

The oil filtration system 10 of the present invention may also be disposed in the scavenge side of the oil delivery system, as shown in phantom in both Figures. According to both configurations, the system 10 is disposed downstream of the bearing compartment 50, with pressurization of the oil flow provided by a scavenge pump 25. Generally, a deaerator (not shown) will be disposed between the bearing compartment 50 and the system 10 in this configuration. Cockpit indicators of pressure and pressure differential may be of analog, digital, alphanumeric, or any other type of display, which sufficiently indicates contemporaneous oil pressure within the system 10 and upstream of the bearing compartments 50 of the engine (not shown).

This invention further contemplates automatic filtration system control which is responsive to pressure differential changes in the system. Pressure detection analysis and sequencing of the bypass valves may be included in a larger automated system such as a F.A.D.E.C. (Full Authority Digital Electronic Control) which generally monitors and manages operational engine parameters. Furthermore, such a controlling process might include an alarm or other indicator means, registration of sensed pressure changes, recording means of those sensed changes, or means for inspecting the system.

Further modifications and improvements of the invention herein disclosed will occur to those skilled in the respective arts and all such modifications and improvements are deemed to be within the scope of the invention as defined by the appended claims.

We claim:

1. A method for providing a filtered lubricant flow in a gas turbine engine having an engine bearing, comprising the steps of:
   providing a first signal means across a primary filter disposed in a lubricant-bearing conduit, the signal means responsive to an excessive threshold pressure across the primary filter,
   diverting the lubricant flow from the primary filter to a secondary filter disposed downstream of the primary filter in response to the first signal means,
   providing a second signal means, responsive to an excessive threshold pressure, downstream of the primary filter,
   diverting the lubricant flow, in response to the second signal means, around the primary and secondary filters and the engine bearing.

2. The method of claim 1, further comprising the step of:
   providing a second signal means, responsive to the sensed pressure downstream of the secondary filter, to the engine controller.

3. A lubricant filtration system for an engine having an engine bearing lubricated by a pressurized lubricant supply, the system comprising:
   a lubricant flowable through a primary lubricant filter disposed in a first lubricant-bearing conduit,
   a first differential pressure sensor disposed in a parallel circuit arrangement across the primary filter,
   a secondary lubricant filter,
   means for diverting the lubricant flow from the primary filter to the secondary filter in response to a first sensed pressure differential exceeding a preselected value, and
   means, responsive to a second sensed pressure detected downstream of the secondary filter, for rerouting the lubricant flow away from the primary and secondary filters.

4. The system of claim 3, wherein the secondary filter is disposed downstream of the primary filter.

5. A lubricant filtration system for an engine having an engine bearing lubricated by a pressurized oil supply, the system comprising:
   a lubricant flowable through a primary lubricant filter disposed in a first lubricant-bearing conduit,
   a first differential pressure sensor disposed in a parallel circuit arrangement across the primary filter, the first sensor having means for indicating a first level warning indicative of an excessive pressure,
   a secondary lubricant filter disposed downstream of the primary filter,
   the lubricant flow divertable from the primary filter to the secondary filter through a bypass valve disposed upstream of both filters in response to a first level warning from the first sensor,
   a pump relief valve disposed upstream of the bypass valve, and
   the pump relief valve responsive to a second pressure sensor disposed downstream of the primary filter, the second sensor having means for indicating a second level warning indicative of a pressure greater than that indicated by the first level sensor,
   the pump relief valve, responsive to the second level warning, diverting the flow around the primary and secondary filters and the engine bearing.

6. The system of claim 1, wherein the engine is a gas turbine engine.

7. The system of claim 1, wherein the bypass valve is responsive to a pressure differential exceeding about 35 pounds per square inch.

8. The system of claim 1, wherein the pump relief valve is responsive to a pressure differential exceeding about 410 pounds per square inch.

9. The system of claim 1, wherein the secondary filter is housed together with the primary filter.

10. The system of claim 1, wherein the filtration system is disposed upstream of the engine bearing.

11. The system of claim 1, wherein the filtration system is disposed downstream of the engine bearing, the system further comprising a lubricant pump disposed therebetween.

* * * * *

UNITED STATES PATENT AND TRADEMARK OFFICE
CERTIFICATE OF CORRECTION

PATENT NO. : 5,121,599

DATED : June 16, 1992

INVENTOR(S) : James G. Snyder, Richard M. Slayton, William E. Fuller, Robert J. Makowski It is certified that error appears in the above-identified patent and that said Letters Patent is hereby corrected as shown below:

In the Claims,
COLUMN 6:
Claim 6, Line 36, "claim 1" should read --claim 3--.

Claim 7, Line 38, "claim 1" should read --claim 3--.

Claim 8, Line 41, "claim 1" should read --claim 3--.

Claim 9, Line 44, "claim 1" should read --claim 3--.

Claim 10, Line 46, "claim 1" should read --claim 3--.

Claim 11, Line 48, "claim 1" should read --claim 3--.

Signed and Sealed this

Seventh Day of September, 1993

*Attest:*

BRUCE LEHMAN

*Attesting Officer*     *Commissioner of Patents and Trademarks*